May 19, 1925.
H. M. CAMERON
SCALE
Filed March 25, 1922
1,538,461
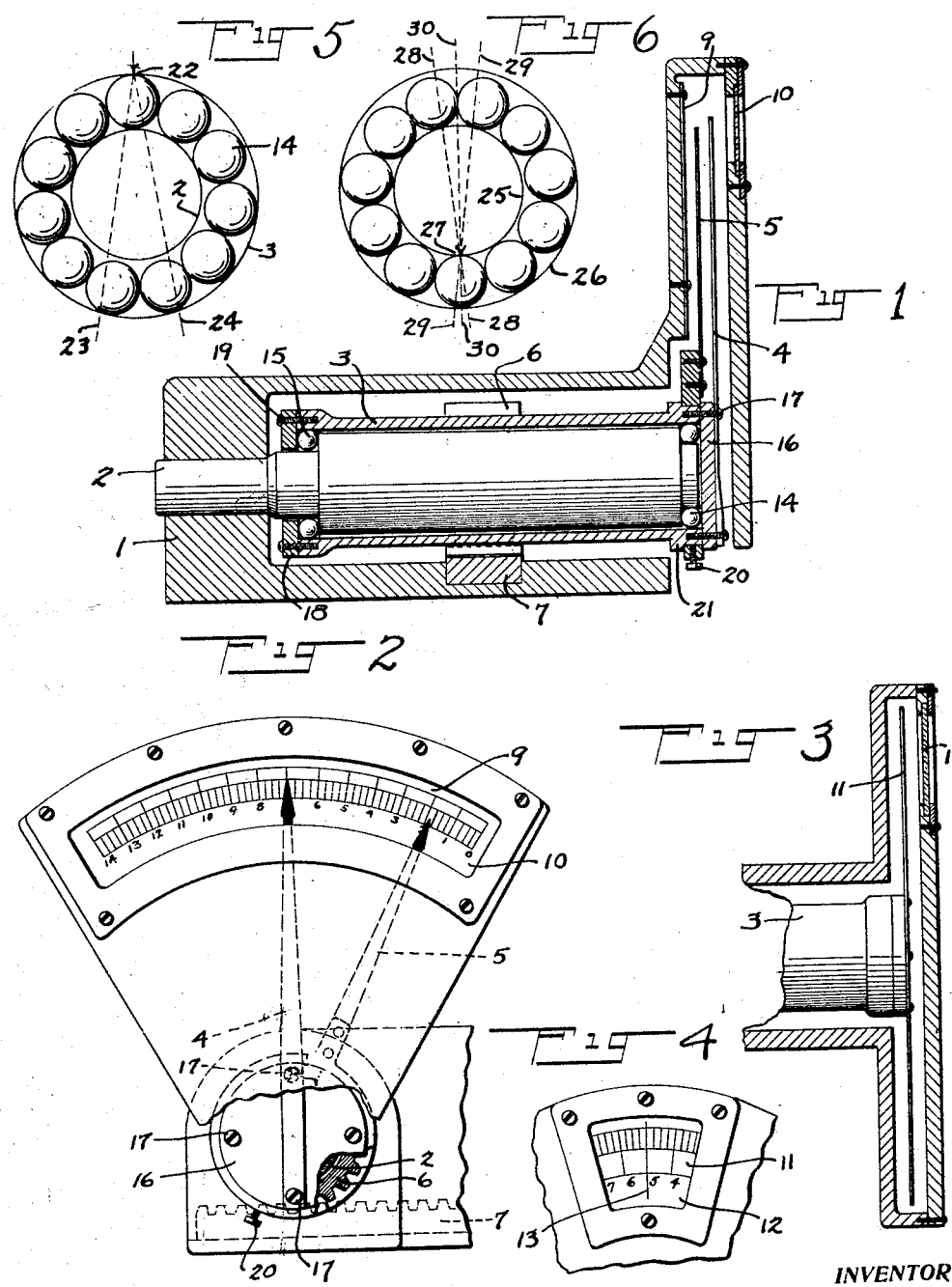
INVENTOR
Hugh M. Cameron
BY
ATTORNEY Patented May 19, 1925.

1,538,461

UNITED STATES PATENT OFFICE.

HUGH M. CAMERON, OF NEWARK, NEW JERSEY, ASSIGNOR TO JOHN CHATILLON & SONS, OF NEW YORK, N. Y., A CORPORATION OF NEW YORK.

SCALE.

Application filed March 25, 1922. Serial No. 546,584.

*To all whom it may concern:*

Be it known that I, HUGH M. CAMERON, citizen of the United States, and a resident of Newark, in the county of Essex and State of New Jersey, have invented certain new and useful Improvements in Scales, of which the following is a specification.

This invention relates to scales and has for its object to provide an improved form of pointer or disc mounting which will be more sensitive and accurate than the pointer or disc mounts now commonly employed.

The common way of mounting pointers and movable or chart dials is on a shaft journaled in one or more bearings and the shaft turned by rack and pinion or other mechanism. In experiment, it is found that this mount is not very sensitive even with careful counter balancing of the pointer, for the reason that the bearings must be loose to reduce friction, and with such looseness the shaft carrying the pointer is naturally supported at its bottom by the bearing and below the shaft axis. Thus, although the shaft theoretically has simply a revolving motion on its axis in the bearing, it actually does not have a fixed axis but has a motion of oscillation due to the rolling movement of the shaft supported at its lower surface in the somewhat larger bearing. With friction present, especially in the case of an ordinary bearing, the movement at the end of a pointer carried by such shaft is not accurate, so that the pointer can come to rest at either side of the exact point indicating the weight on the scale, or zero, due to the pointer carrying element being supported at its bottom in a necessarily loose bearing. Where close weighing is to be done, or with large multiplication, this error becomes objectionable and may lead to refusal of approval by official sealers or inspectors of weights and measures.

In scales of large capacity, say those indicating on a single dial between 100 and 1,000 or more pounds, with beams or other devices for indicating multiples of the totals carried by a single dial, accuracy is enhanced by the replacement of ordinary bearings for the pointer shaft or ball bearings. The interposition of a ball bearing between a pointer shaft and the support tends to increase the error above indicated, because the ball races increase the diameters and consequently the distance between the center of the rotary shaft and the support on the outside race below the balls. It thus results that the interposition of ball bearings between a pointer shaft and the casing or support is ineffective to reduce the error, tending rather to accentuate it.

The object of this invention is to eliminate this error by providing a hollow indicator shaft which will be journaled on a fixed stud carried by the casing, the result being that the indicator shaft is suspended from a point above the axis of rotation on the stud or bearing, instead of being supported in the bearing at a point below the axis of rotation. An indicator mounted on such a hollow shaft thereby acquires the characteristics of a pendulum, and naturally tends by its own suspension to assume a mean position of equilibrium when properly counter balanced. Where an indicator mounted according to this invention is to be provided with ball bearings, the necessary increase of diameter becomes an advantage by increasing the pendulum characteristics of the suspension, yet not interfering with the desired sensitiveness and accuracy of indication, and being equally free from error at all positions, since such arrangement can be exactly counter balanced and only acts as a pendulum by reason of utilizing the necessary play found in any bearing, whether ordinary, roller, or ball.

Further advantages of this invention are obtained where a plurality of pointers is used on the same shaft, for example, a tare pointer in connection with a weighing pointer.

Referring to the accompanying drawings:

Figure 1 is a section of a portion of a scale embodying the invention.

Figure 2 is a front view.

Figure 3 is a section showing a chart or dial in connection with a window.

Figure 4 is a detail of Figure 3.

Figure 5 is a diagrammatic view showing the principle of this invention, and

Figure 6 is a diagram inserted for comparison, showing the different distribution of forces in an ordinary bearing.

1 represents the frame or case of a scale carrying a fixed stud 2, on which is rotatably mounted the hollow indicator shaft 3 carrying, for example, a tare pointer 4 and adjustable weighing pointer 5. If only one pointer is used, the pointer 4 will ordinarily be retained as the weighing pointer. The shaft 3 also carries, for illustration of actuating mechanism, a pinion 6 engaging with rack 7. The pointers move over a dial 9, viewed through window 10 in the casing, the dial here shown being of the fan type, but the invention being applicable to circular or other dials. In Figure 5 a modification is shown in which the shaft 3 carries a chart 11 which revolves behind the window 12, the window having the center line 13 cooperating with the graduations on the chart to give the indications.

Ball bearings 14—15 are preferably inserted between the shaft 3 and stud 2, as herein shown. The pointer 4 is mounted on a cap 16 by screws 17 which also fasten the pointer and cap to the end of shaft 3, thereby retaining the balls 14, while at the other end a similar cap 18 is attached by screws 19 to retain the balls 15. 20 is a set screw carried by pointer 5 for changing its adjustment, it being seen that the pointer is rotatably held on shaft 3, as between cap 16 and shoulder 21 on shaft 3. This construction also brings the end bearing practically under the pointer or chart, which reduces the lateral or canting movement on the bearings due to the weight of the indicator.

Figure 5 shows the play of the ball bearing exaggerated, it being seen that the balls 14 have dropped away from the bottom of the stud 2 and are supported by the hollow shaft 3, while at the top the hollow shaft 3 rests on the top ball at the point 22, indicated by the arrow. The dotted lines, 22—23, 22—24, indicate how the pointer assembly will swing like a pendulum suspended from the point 22, and naturally tend to come to rest at a mean position of equilibrium. In Figure 6 the converse is shown, where the pointer carrying shaft 25 is movably supported in the bearing 26. In this instance the point of support is below the axis of rotation and about at arrow 27, so that the shaft 25 and pointer assembly carried thereby tend to oscillate about this point 25, without any pendulum action. Consequently, the pointer may come to rest at either of the points indicated by lines 28—28 or 29—29, which positions give an error in the indication, or at the correct intermediate position 30 on line 30—30.

For the purposes of explaining the diagrams of Figures 5 and 6, it may be assumed that the zero is at the top of the dial, but the same principles apply for all of the dial indications and pointer positions. Although a pointer counter-balance is not shown herein, it is to be understood that such will be applied according to common practice, the pointer as heretofore made being practically counter balanced relatively to the shaft axis by the part below the center secured to the cap 16 being sufficiently thicker than the part above as to accurately balance the entire pointer assembly, so that without load the pointer will stay in any position in which it is put, in each position having the pendulum action heretofore described.

I claim:

1. In a scale, a substantially counter balanced pivoted indicator having its support above the axis of rotation and utilizing the bearing looseness to provide a pendulum action and means for actuating said indicator.

2. A scale comprising a frame, a fixed stud, a tubular indicator carrying member journaled on said stud whereby said member depends and oscillates as a pendulum on said stud in any position thereof, an indicator carried thereby, and actuating means.

3. A scale comprising a frame, a fixed stud having a ball race at each end, a tubular indicator carrying member journaled on said stud having cooperating ball races with balls interposed between said races, whereby said member depends and oscillates as a pendulum on said stud, an indicator carried thereby, and actuating means.

4. In a scale, a fixed bearing stud, an indicator carrying hollow shaft supported on said stud, an indicator carried at the end of said hollow shaft, a support for said shaft on said stud adjacent the plane of the indicator, and another support for said shaft spaced from the first mentioned support.

5. In a scale, a sensitive pivoted indicator supported above its axis of rotation and adapted to have a pendulum action in the looseness of its pivotal support, while in any of its indicating positions, independent of the means for moving such indicator, and an actuating means for said indicator.

6. In a scale the combination with a fixed stud supported at one end, of a hollow shaft supported on said stud above its axis of rotation whereby a limited pendulum movement of said shaft is possible in any position, an indicator secured to said shaft, said shaft having a supporting bearing surface adjacent said indicator, gear teeth on said shaft, and a rack engaging the teeth to actuate said shaft.

Signed at New York city in the county of New York and State of New York this 24th day of March A. D. 1922.

HUGH M. CAMERON.